UNITED STATES PATENT OFFICE.

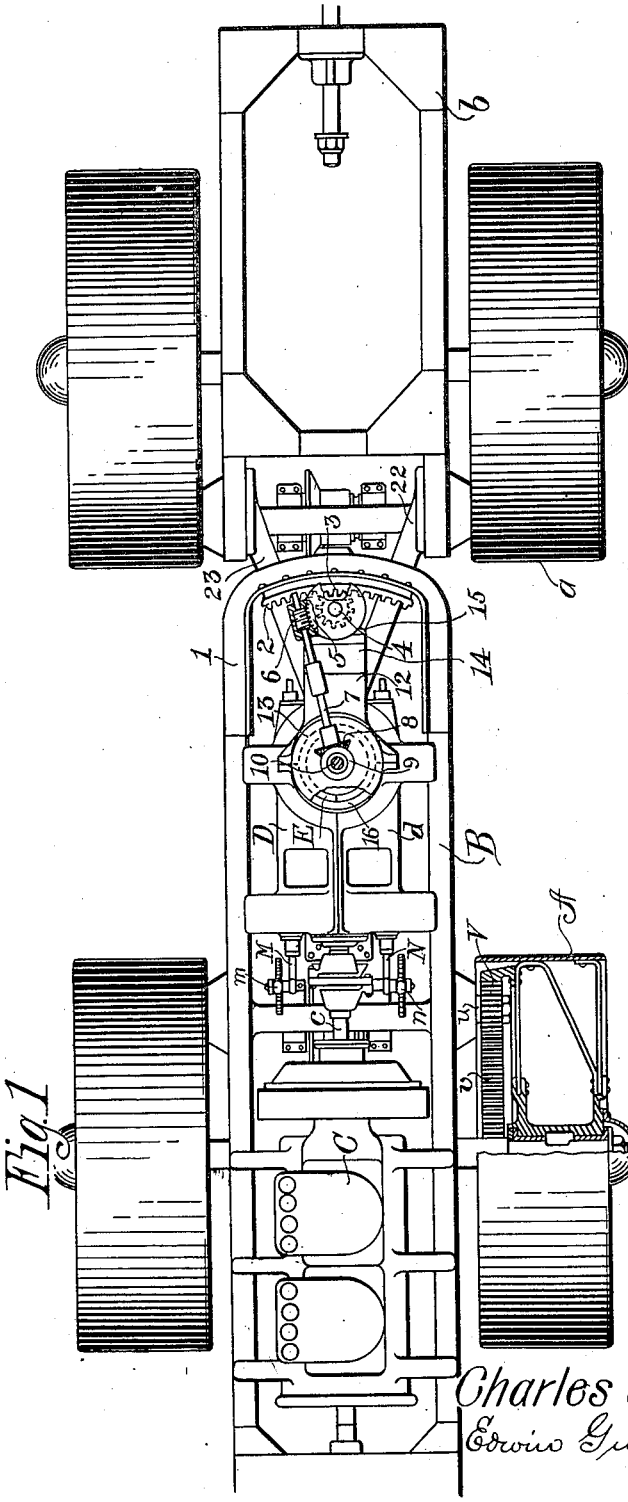

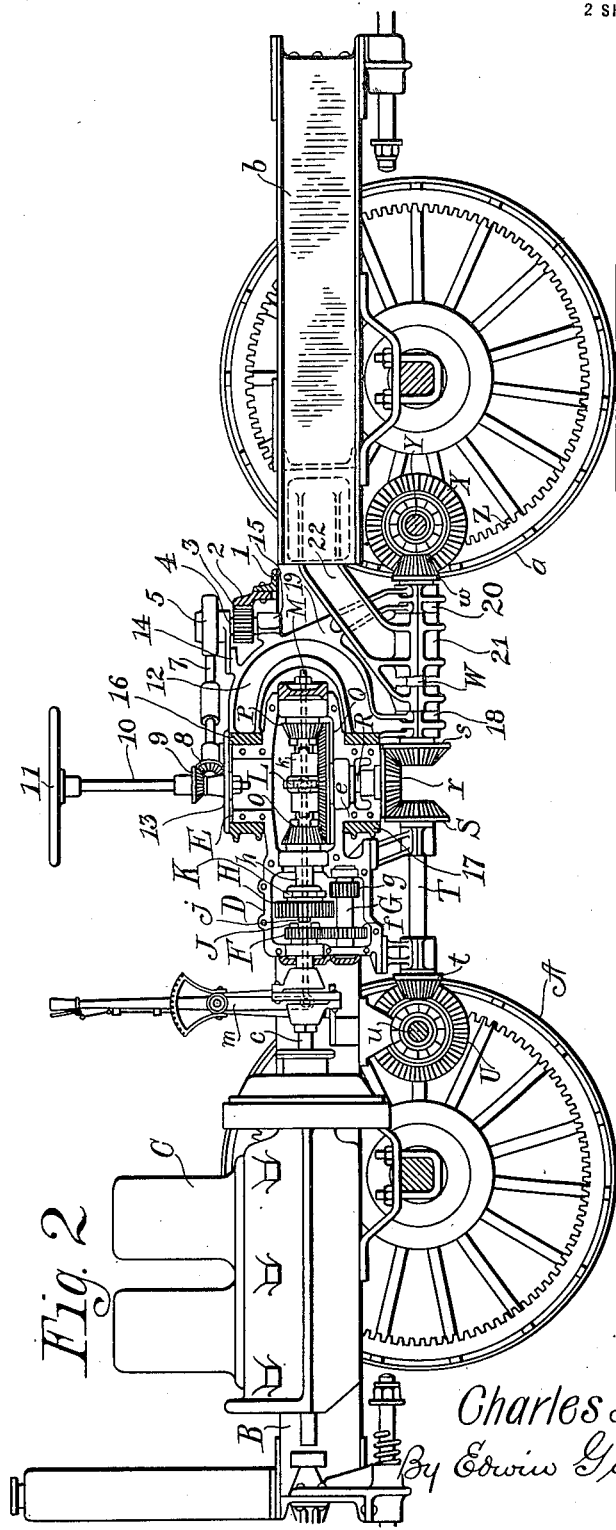

CHARLES A. ROGERS, OF ALBION, PENNSYLVANIA, ASSIGNOR, BY MESNE ASSIGNMENTS, TO ROGERS TRACTOR AND TRAILER COMPANY, A CORPORATION OF DELAWARE.

TRACTOR.

1,356,789.

Specification of Letters Patent. Patented Oct. 26, 1920.

Application filed June 13, 1919. Serial No. 303,895.

*To all whom it may concern:*

Be it known that I, CHARLES A. ROGERS, citizen of the United States, residing at Albion, in the county of Erie and State of Pennsylvania, have invented certain new and useful Improvements in Tractors, of which the following is a specification.

This invention relates to tractors, and belongs to that class or type of self-propelled vehicles driven by gasolene engines, in which front and rear frames having fixed axles are pivotally connected together and the steering of the vehicle is effected by causing the frames to assume positions at angles with each other.

It is the object of this invention to produce a tractor of the character stated wherein the various parts are of special construction and arrangement, resulting it is believed in a machine of great strength and mobility, and particularly economical of driving power required to perform the work desired of it.

In the accompanying drawings the construction and arrangement of the parts of this invention are illustrated, and Figure 1 represents a top plan view. Fig. 2 is a side view, with the front frame in vertical section longitudinally, and one-half of the gear casing removed to disclose internal devices.

Throughout the drawings and description the same letter or numeral is employed to refer to the same part.

Considering the drawings, the front wheels A, and the rear wheels $a$ support respectively the front frame B and the rear frame $b$. C is an engine carried by the front frame, and it has the engine shaft $c$. The front frame carries a gear casing comprising two separable halves D and $d$. When these halves meet they form the upper throat E and lower throat $e$ of the casing, which will be again mentioned in this description.

The engine shaft $c$, as set forth in Fig. 2, extends into the gear casing and terminates in the clutch gear wheel F. The gear F engages another gear $f$ on the countershaft G, and this shaft G carries also the small gear wheel $g$. Adjacent to the gear F is the clutch gear H on the extension shaft $h$, and it will be noted that the gear F has the lugs J and the gear H has the lugs $j$, which may become engaged if the gear H should be moved toward the gear F by means of the grooved collar and fork device K. The gearing just described is all of common construction and operation, and intended to give to the tractor two different speeds. Thus, if the wheel H is moved to the left into engagement with the clutch gear F, the engine shaft is directly coupled to the driving mechanism and the small gear $g$ rotates idly. But, if the gear H is moved to the left so as to engage the small gear $g$, power is transmitted by gear F to gear $f$ and by small gear $g$ to gear H, with a manifest reduction of the velocity of revolution of the extension shaft $h$. The shaft $h$, being suitably supported, carries upon it the movable clutch barrel $k$, and by means of the sliding rod M and lever $m$ the barrel $k$ may be moved in the direction of its length either way. There is a similar sliding rod N and lever $n$ for moving the clutch gear H, the rod and lever being shown in Fig. 1. The clutches and operating means are all of the customary character, and call for no particular explanation.

If the clutch barrel $k$ on the extension shaft $h$ is moved to the left it engages the bevel gear O, and if moved in the other direction it meshes with the bevel gear P. Thus, the power may be applied to the horizontal gear Q and vertical shaft R to propel the tractor either forward or backward. At the lower end of the shaft R is the bevel gear $r$, meshing with like gears S and $s$. The gear S terminates the horizontal shaft T, which is suitably supported in bearings and has at the other end a bevel gear $t$ which engages the larger gear U of a set of differential gearing acting upon the horizontal transverse shaft $u$. The shaft $u$ is provided with the pinion V that engages the annular rack upon the interior of one of the front wheels A, and by means of like pinions and racks the four wheels of this invention are driven. The arrangement described for driving the wheels A and $a$, being of common construction and operation, no further explanation is believed to be needed.

On the right hand side of bevel gear $r$ in Fig. 2 it is engaged by the bevel gear $s$ that terminates the horizontal driven shaft W, and this shaft carries the bevel gear $w$ at its other end. The gear $w$ engages the larger gear X of a set of differential gearing that acts upon a horizontal transverse shaft Y, and this shaft is provided with a pinion, not shown, but in all respects similar to the pinion V already described, and the engagement of such pinion with the rack Z turns the rear wheel $a$ as will be readily understood.

Best illustrated in Fig. 1 is the extension or U-shaped yoke frame 1, which carries the horizontal geared rack 2. A pinion 3 engages the rack 2. The pinion is attached to the vertical shaft 4, and so is the worm wheel 5. A worm 6 engages the worm wheel 5 and the worm is attached to the worm shaft 7 at its outer end. At the other end of the shaft 7 there is a bevel gear 8 that engages a like gear 9 on the vertical steering rod 10, which is topped by the usual steering wheel 11.

As shown in Fig. 2 the C-shaped member 12 is located between the front frame B and the rear frame $b$ of this tractor invention, and, as shown in Fig. 1, the member 12 is closed at the top by the disk or table plate 13, upon the center of which the steering rod 10 is erected. The C-shaped member 12 is in practice provided with the brackets 14 and 15, formed integrally with the member, the functions of which are to carry the bearings of the vertical worm wheel shaft 4. It will be observed on the drawings that the C-shaped member 12 has the upper collar 16 and the lower collar 17, and that those collars engage the throats E and $e$ of the gear casing described as made up of the halves D and $d$, and carried by the front frame B. It will be understood that the collars 16 and 17 comprise separable portions in order that the collars and throats may be assembled as would be required to place them in the relative positions set forth. Now considering Fig. 2, it will be seen that the lower part of the member 12 carries the end portion 18 of the divided or composite bearing for the driven shaft W. The other end portion of this bearing, marked 20, terminates the inclined leg 19 forming a part of and extending downwardly from the member 12. The main portion or body of the bearing for the shaft W is referred to by number 21, and it is attached to the legs 22 and 23 which diverge from the bearing and are secured to the rear frame $b$. In other words, the legs 22 and 23 converge in an inclined direction downwardly and meet to form the body 21 of the bearing for the shaft W. In Fig. 2 it will be seen that the leg 19 of member 12 inclines to the rear and downwardly between the legs 22 and 23.

In operation, this tractor invention is guided by causing the front frame and the rear frame to assume positions at angles with each other. That condition of things is brought about by turning the steering wheel and causing the pinion 3 to traverse the curved rack 2, the two frames being coupled by what is practically a knuckle joint formed by the engagement of the collars 16 and 17, and the throats E and $e$. As stated, those collars are parts of the member 12 located between the frames, and which may in a sense be regarded as an independent part, but which is actually a portion of the rear structure of this tractor invention, and turns with such rear portion. It will be observed further from the drawings, that the engagement of the shaft W and the portions of its divided bearing permit the rear frame and its atachments, wheels and axles, to tilt transversely with respect to the front frame, and the rear frame may rise or fall with respect to the front frame in the customary vehicular manner.

Having now described this invention and explained the mode of its operation, what I claim is:—

1. In a tractor, the combination with a front frame and front wheels, of a rear frame and rear wheels, a gear casing having an upper throat and a lower throat, the said casing being attached to the said front frame, a C-shaped member arranged between the front and rear frames and having upper and lower collars engaging the said throats of the casing and constituting the pivotal connection between said front and rear frames, a longitudinal shaft extending from the said casing, and means operated by the shaft for driving the rear wheels, the said shaft having a plurality of bearings a part of the said bearings being carried by the said C-shaped member and a part of said bearings being connected with the said rear frame.

2. In a tractor, the combination with a front frame and front wheels, of a rear frame and rear wheels, a gear casing comprising a plurality of separable portions and having an upper throat and a lower throat, the said casing being attached to the said front frame, a C-shaped member arranged between the front and rear frames and having upper and lower collars engaging the said throats of the casing and constituting the pivotal connection between the said front and rear frames, a longitudinal shaft extending from the said casing, and means operated by the shaft for driving the rear wheels, the said shaft having a plurality of bearings a part of the said bearings being carried by the said C-shaped member and a part of said bearings being connected with the said rear frame.

3. In a tractor, the combination with a front frame and front wheels, of a rear frame and rear wheels, a gear casing divided into halves vertically, the said halves being joined together forming an upper throat and a lower throat, the said casing being attached to the said front frame, a C-shaped member arranged between the front and rear frames and having upper and lower collars engaging the said throats of the casing and constituting the pivotal connection between the said front and rear frames, a longitudinal shaft extending from the said casing, and means operated by the shaft for driving the rear wheels, the said shaft having a plurality of bearings a part of the said bearings being carried by the said C-shaped member and a part of said bearings being connected with the said rear frame.

4. In a tractor, the combination with a front frame and front wheels, of a rear frame and rear wheels, a gear casing having an upper throat and a lower throat, the said casing being attached to the said front frame, a C-shaped member arranged between the said front and rear frames and having upper and lower collars engaging the said throats of the casing, a driven shaft having a bearing comprising end portions connected with the said C-shaped member, and a middle portion connected with the said rear frame.

5. In a tractor, the combination with a front frame and front wheels, of a rear frame and rear wheels, a gear casing having an upper throat and a lower throat, the said casing being attached to the said front frame, a C-shaped member arranged between the front and rear frames and having upper and lower collars engaging the said throats of the casing, a driven shaft having a divided bearing, a portion of the said bearing being connected with the said C-shaped member, and a portion of the said bearing being connected with the said rear frame, and devices carried by the said C-shaped member and acting upon the said front frame for moving the said frames into angular positions respecting each other with the throats of the said casing and the said collars as pivotal connections.

6. In a tractor, the combination with a front frame and front wheels, of a rear frame and rear wheels, a gear casing having an upper and lower throat, the said casing being attached to the said front frame, a C-shaped member arranged between the front and rear frames and having upper and lower collars engaging the said throats of the casing, a driven shaft having a divided bearing, a portion of the said bearing being connected with the said C-shaped member and a portion of the said bearing being connected with the said rear frame, the said front frame having a curved rack transversely arranged, a pinion carried by the said C-shaped member and arranged in mesh with the said rack, a steering wheel, and connections actuated by the said steering wheel and operating the said pinion whereby the said frames are moved into angular position respecting each other with the throats of said casing and the said collars as pivotal connections.

7. In a tractor, the combination with a front frame and front wheels, of a rear frame and rear wheels, a gear casing having an upper throat and a lower throat, the said casing being attached to the front frame, a longitudinal shaft extending from the said casing, means operated by the shaft for driving the front wheels, a member arranged between the front and rear frames and having upper and lower collars engaging the said throats of the casing and constituting the pivotal connection between the said front and rear frames, a second longitudinal shaft extending from the said casing, and means operated by the said shaft for driving the rear wheels, the said shaft having a plurality of bearings a part of the said bearings being carried by the said member and a part of the said bearings being connected with the said rear frame.

8. In a tractor, the combination with a front frame and front wheels, of a rear frame and rear wheels, a gear casing having an upper throat and a lower throat, the said casing being attached to the said front frame, a C-shaped member arranged between the said front and rear frames and having upper and lower collars engaging the throats of the casing, a driven shaft having a divided bearing, legs attached to the said rear frame and converging to and connected with a portion of the said shaft bearing, the said bearing having separate end portions, one of the said end portions being connected with the lower part of the said C-shaped member, and the said C-shaped member having a leg passing between the said converging legs and attached to the other end portion of the said shaft bearing.

9. In a tractor, the combination with a front frame and front wheels, of a rear frame and rear wheels, a longitudinal shaft extending to the said front wheels, means operated by the said shaft for driving the said front wheels, a longitudinal shaft extending to the said rear wheels, means operated by the said shaft for driving the rear wheels, a gear arranged to drive both of the said shafts, a casing for said gear supported by the front frame, and a member pivotally connected with the top and bottom of said casing thereby forming the pivotal connection between said frames, the said shaft for driving the rear wheels having a plurality of bearings a part of the said bearings being carried by the said member and a part of the said bearings being connected with the said rear frame.

In testimony whereof I affix my signature.

CHARLES A. ROGERS.